United States Patent [19]

Biceroglu

[11] Patent Number: 5,288,391
[45] Date of Patent: Feb. 22, 1994

[54] RENDERING OILY WASTES LANDTREATABLE OR USABLE

[75] Inventor: Omer Biceroglu, Clearwater, Canada

[73] Assignee: Exxon Research & Engineering Company, Florham Park, N.J.

[21] Appl. No.: 787,162

[22] Filed: Nov. 4, 1991

Related U.S. Application Data

[63] Continuation of Ser. No. 454,665, Dec. 21, 1989, abandoned.

[51] Int. Cl.$^5$ .................... C10G 21/12; C10G 21/14
[52] U.S. Cl. ........................... 208/13; 208/45; 208/177; 208/311
[58] Field of Search .............. 208/13; 210/767, 768, 210/770, 771, 772

[56] References Cited

U.S. PATENT DOCUMENTS

| | | | |
|---|---|---|---|
| 1,092,386 | 4/1914 | Pau et al. | 208/13 |
| 2,064,544 | 12/1936 | Lauer et al. | 208/13 |
| 2,198,566 | 4/1940 | Synnott, Jr. | 208/13 |
| 2,338,986 | 1/1944 | Waterman | 208/13 |
| 2,413,310 | 2/1946 | Block | 208/13 |
| 3,692,668 | 9/1972 | McCoy et al. | 208/13 |
| 3,696,021 | 10/1972 | Cole et al. | 208/13 |
| 3,729,414 | 4/1973 | Harris et al. | 210/772 |
| 4,040,958 | 8/1977 | Rammler | 210/772 |
| 4,097,378 | 6/1978 | St Clair | 208/13 |
| 4,200,001 | 6/1980 | Knowlton | 210/806 |
| 4,260,489 | 4/1981 | Greig et al. | 210/771 |
| 4,264,453 | 4/1981 | Mraovich | 208/13 |
| 4,406,796 | 9/1983 | Duval | 210/772 |
| 4,447,332 | 5/1984 | Crisman et al. | 210/771 |
| 4,476,928 | 10/1984 | Green | 210/767 |
| 4,544,491 | 10/1985 | Tyson et al. | 210/772 |
| 4,686,048 | 8/1987 | Atherton et al. | 208/13 |
| 4,741,840 | 5/1988 | Atherton et al. | 210/778 |
| 4,812,225 | 3/1984 | Corti et al. | 208/13 |
| 4,839,022 | 6/1989 | Skinner | 208/13 |
| 4,842,715 | 6/1984 | Paspek, Jr. et al. | 208/13 |

OTHER PUBLICATIONS

*Chemical Technology of Petroleum* Cruse & Stevens 3rd Ed. McGraw Hill 1960 pp. 482–485.

*Primary Examiner*—Helane Myers
*Attorney, Agent, or Firm*—Chris P. Konkol; Roy J. Ott

[57] ABSTRACT

A process for deoiling wastes is disclosed. The process is integrated with a refinery and utilizes a refinery intermediary hydrocarbon stream as a solvent to recover waste oil for reprocessing in the refinery and to produce waste solids, which are either reused or disposed for landtreatment.

7 Claims, No Drawings

RENDERING OILY WASTES LANDTREATABLE OR USABLE

This is a continuation of application Ser. No. 454,665, filed Dec. 12, 1989, now abandoned.

A process is disclosed comprising the treatment of an oily sludge to produce waste solids suitable for landtreatment, and to recover waste oil capable of being reprocessed in a refinery. Depending on the particular sludge, the waste solid produced by the present process may be reusable as fuel.

BACKGROUND OF THE INVENTION

Petroleum refineries have need to dispose of wastes comprised of oily sludges (oil-solid or oil-solid-water mixtures) produced in wastewater treatment facilities and hydrocarbon storage tanks. Most of these wastes are considered biodegradable and can be disposed of at landtreatment sites. Landtreatment (landfarming) is a low cost disposal method for such wastes. However, certain types of oily sludges cannot be landtreated due to the biorefractory nature of the oil contained therein. For example, some refinery tank bottom sludges (e.g., coker hot slop tank sludge and cat fractionator bottoms sludge) contain viscous oil and high levels of biorefractory polynuclear aromatic components, which are not suitable for disposal through landtreatment. Removal of biorefractory oil from oily sludges in order to make them suitable for landtreating could be an attractive waste management option. However, conventional deoiling processes and services are costly and in some cases do not achieve the desired result. For example, extraction-based technologies using high hydrocarbon gases ($C_3$ to $C_5$) and special solvents rely on recovery and recycle of the solvent, and may leave asphaltene fractions of the oil on the solids.

It is therefore an object of the present invention to provide a flexible low cost process for rendering waste oily sludges suitable for landtreatment. Alternatively, some kinds of sludges may be rendered usable, for example, sludges composed of coke fines can be converted into solid fuel material. It is a further object of the invention to be able to handle oily sludges containing biorefractory and/or asphaltenic oil fractions. It is a still further object to displace any biorefractory oil in the sludge with a biodegradable oil.

The prior art discloses various processes for treating oily sludges. U.S. Pat. No. 3,696,021 to Cole et al. discloses mixing an oily sludge with light hydrocarbons passing through a conduit. Solids, water and oil are separated in a drum. The oil is heated in a vessel and distilled in a tower to separate heavy oil and recirculate the light oil. The solids are used for landfill.

U.S. Pat. No. 4,014,780 to McCoy mixes an oily sludge with a diluent recycle oil and heats the mixture with steam to recover the oil and form dry solids for a landfill. U.S. Pat. No. 4,097,378 to St. Clair discloses mixing sludge with oil and then treating the same with recycle oil. U.S. Pat. No. 4,264,453 to Mraovich discloses filtering coke from oil wastes mixed with a diluent oil. U.S. Pat. No. 4,686,048 to Atherton et al. prepares sludge fines for a landfill by mixing the sludge with a hydrocarbon diluent.

U.S. Pat. No. 4,264,453 addresses the treatment of coal tar wastes and uses a non-aromatic diluent with surfactants to render the wastes (coke fines, viscous oil, water) amenable to separation by filtration. U.S. Pat. No. 3,696,021 uses butane, pentane or their mixture as a solvent and requires a high temperature (300°–400° F.) and a high pressure (500–600 psig) separation of solvent from waste oil. U.S. Pat. No. 4,686,048 uses a hydrocarbon type solvent having a boiling point when mixed with water of less than 212° F. In addition, it requires mixing of filtered cake with 100% to 1500% water, and distilling the mixture to remove the residual solvent from the solids.

Various patents disclose combining a waste sludge with a refinery stream. U.S Pat. No. 4,206,001 discloses a process for separating solid and liquid materials in an FCC rundown tank to permit liquids to be returned to refinery process streams. The process comprises the addition of a selected refinery stock, preferably kerosene-like, into the rundown tank, followed by washing of solids with an aqueous solution, and subsequent settling to separate the aqueous and organic phases. U.S. Pat. No. 2,487,103 teaches adding a heavy naphtha fraction to sludge, followed by addition of water for hydrolysis and phase separation. U.S. Pat. No. 3,696,021 discloses mixing refinery sludges with light hydrocarbons to deoil the solids, followed by gravitational separation and steaming of the separated solids to remove the light hydrocarbons. Other patents in this area include U.S. Pat. No. 2,413,310; U.S. Pat. No. 3,079,326; U.S. Pat. No. 1,092,386; and U.S. Pat. No. 1,092,386.

BRIEF DESCRIPTION OF THE INVENTION

The present invention is directed to a process for treating sludges to produce a solids product that can be either used for fuel or disposed of by landtreatment. According to the invention, the sludge is treated with a solvent obtained from a refinery unit, which solvent extracts and displaces oil in the sludge. The resulting sludge-solvent mixture is then separated into liquid and solid phases. The liquid phase is returned to the refinery for reprocessing, and the solid phase is thereby rendered suitable for low cost disposal by means of landtreatment. In some cases, it is advantageous to use this solid material for fuel.

The present process accomplishes displacement of viscous and/or biorefractory material in oily wastes with an easily biodegradable and reusable low value refinery stream such as light cat heating oil (LCHO), heavy cat naphtha (HCN), or mixtures thereof. Although deoiling is not a primary objective of this invention, the treatment process may achieve a reduction in volume of waste and in overall oil content of the waste, in addition to displacing problematic components.

DETAILED DESCRIPTION OF THE INVENTION

The present invention accomplishes deoiling an oily sludge produced in a refinery, and comprises (a) in an extraction zone, mixing the sludge with a solvent comprising a distillate stream from a refinery unit, whereby oily components of the sludge are extracted into the solvent; and (b) in a separation zone, separating the mixture formed in the extraction zone into at least two streams, a first stream comprising said solvent, including extracted oily components, and a second stream comprising substantially all of the solids in said sludge, whereby these solids are either rendered reusable as a valuable fuel, or else made suitable for landtreatment.

This process accomplishes the removal of most of the heavy molecular weight oil in the waste and does not require recovery of solvent from a oil-solvent mixture.

The process is a refinery integrated process employing an intermediary hydrocarbon stream as a solvent, and utilizing the refinery for reprocessing of a resulting oil-solvent mixture. The processing steps can be carried out in batch, continuous, or semi-continuous mode, using single or multiple vessels. The processing apparatus can be built as a mobile or stationary unit.

The scope and extent of treatment according to the present invention may depend on the properties of the sludge and its oil (e.g., the amount of heavy hydrocarbons such as asphaltenes), the desired quality specification of the solid product, and local restrictions associated with a landtreatment site.

The extraction step of the present process involves treatment of the sludge with a solvent which is a low value, reusable refinery stream, for example a highly aromatic distillate stream from a thermal or catalytic cracking unit. This solvent is capable of dissolving and displacing the sludge-oil without causing deasphalting. Preferably, the solvent is easily biodegradable and suitably comprises at least 20 percent by weight aromatics, preferably 40 to 75 percent aromatics and has a boiling point of 100 to 600° C., preferably 160° to 400° C. Examples of suitable solvents include light heating oil distillate from a cat cracker, heavy naphtha such as light natural naphtha (LNN), heavy natural naphtha (HNN), powerformer feed, reformate, and heavy cat naphtha (HCN).

Extraction according to the present process may be carried out at a sludge to oil ratio suitably varying from 2:1 to 1:5, at atmospheric pressure, and at a temperature below the initial boiling point of the solvent, at a level yielding a sludge viscosity sufficient for mixing. Preferably, the oily waste is mixed with a distillate stream in a waste/distillate ratio of 2:1 to 1:2 at 10° to 100° C. Mixing is continued until the liquid phase properties do not change, and/or approach levels expected from a theoretical blend of waste oil and solvent in the same ratio.

Following extraction of the sludge, a liquid-solid separation is carried out, preferably by gravity settling, which separation is continued until supernatant suspended solids concentration reaches an equilibrium level or a level acceptable for reprocessing. Water can be added to aid in separation of phases and decanting of the supernatant. However, if solid settling characteristics do not permit a reasonably fast separation of solid and liquid or the solid concentration of the supernatant is higher than reprocessing specifications, then a mechanical separation, for example, by means of filtration or centrifugation, may be employed.

The liquid supernatant produced by solid-liquid separation is returned to the refinery slop system and from there to an appropriate refinery unit (e.g., tank, distillation tower, FCC, etc.) or blended into whole crude for reprocessing. The separated solid material may be sent to landtreatment. However, depending on the make-up of the original sludge, this solid material may be a valuable product, for example, for general fuel use in a combustion zone to produce heat and/or energy.

The above treatment procedure can be carried out in single or multiple stages, depending on specific application and performance requirements. Mixing and settling can be done in the same or separate tanks, which tanks suitably are the original product storage tanks containing the waste. Mixing and settling can be carried out in a pit as well.

The following examples are given to illustrate the present invention and to indicate its unexpected degree of effectiveness. It is not intended to limit the present invention to the particular method employed, the particular sludge composition, or the specific conditions of operation employed in presenting these examples.

EXAMPLE 1

This example illustrates treating according to the present process a refinery coker hot slop tank sludge, an asphalt-like material containing 30% highly viscous oil and 70% coke fines. The sludge could not be used as a fuel in conventional combustion equipment due to injection problems and could not be disposed of through in-house treatment due to its high viscosity oil.

The properties of the sludge oil and the distillate solvent (heavy naphtha) is provided in Table 1 below.

TABLE 1

| GC Distillation, °C. | Sludge Oil | Distillate |
|---|---|---|
| 10% vol | 244 | 162 |
| 30% vol | 304 | 186 |
| 50% vol | 400 | 200 |
| 70% vol | 487 | 206 |
| 90% vol | 560 | 218 |
| FBP | 611 | 262 |
| Test Conditions and Results | | |
| Sludge/Distillate Ratio, wt/wt | | 1/1 |
| Temperature, °C. | | 20 |
| Mixing Time, h | | 1 |
| Supernatant Suspended Solids after 4 h Gravity Settling, wt % | | 0.15 |
| Total Oil Remaining in Treated Sludge, wt % | | 20.4 |
| % Reduction in Total Oil | | 32 |
| Original Viscous Oil Remaining in Treated Sludge, wt % | | 2.6 |
| % Reduction in Viscous Oil | | 96 |
| GC Distillation of Oil Remaining in Treated Sludge, vol % off | | |
| at 260° C. | | 87.5 |
| at 290° C. | | 88.5 |
| at 500° C. | | 96 |

Treatment of this material according to this invention reduced total oil content of the sludge by 23% and the viscous oil content by about 90% and changed the asphalt-like material into sellable loose coke fines.

EXAMPLE 2

The present process was also applied to cat fractionator bottoms (CFB) product storage tank sludge which cannot be land treated effectively due to its high aromatic content. This CFB sludge contained 66 wt. % oil and 34 wt. % solids. The properties of the sludge oil and distillate are provided in Table 2 below.

In this example, the CFB sludge was treated in two stages: the sludge separated from the first stage is further treated in a second stage using fresh distillate material. Catalyst fines settled well by gravity providing that the viscosity of supernatant was not too high to hinder gravity settling. Distillate supernatant contained less than 0.1 wt % solids. The test conditions and overall treatment performance are summarized below:

TABLE 2

| GC Distillation, °C. | Sludge Oil | Distillate |
|---|---|---|
| 10% | 314 | 213 |
| 30 | 401 | 246 |
| 50 | 431 | 271 |
| 70 | 459 | 307 |
| 90 | 499 | 355 |
| 95 | 519 | 371 |
| FBP | 566 | 421 |
| Test Conditions and Results | | |

TABLE 2-continued

|  | 1st Stage Treatment | 2nd Stage Treatment |
|---|---|---|
| Sludge/Distillate Ratio, wt/wt | 1/0.5 | 1/0.5 |
| Temperature, °C. | 50 | 20 |
| Mixing Time, h | 1 | 1 |
| Supernatant Suspended Solids after 12 h settling, wt % | <0.1 | <0.1 |
| Total Oil Remaining in Treated Sludge, wt % |  | 45 |
| % Reduction in Total Oil |  | 32 |
| % 400° C. + Oil Remaining in Treated Sludge |  | 8 |
| % Reduction in Oil Boiling Above 400° C. |  | 83 |
| GC Distillation of Oil Remaining in Treated Sludge, vol % off |  |  |
| at 400° C. |  | 82 |
| at 470° C. |  | 95 |

The process of the invention has been described generally and by way of example with reference to particular embodiments for purposes of clarity and illustration only. It will be apparent to those skilled in the art from the foregoing that various modifications of the process and materials disclosed herein can be made without departure from the spirit and scope of the invention.

What is claimed is:

1. A process for deoiling an oily sludge produced in a refinery, consisting essentially of the following steps:
   (a) in an extraction zone, mixing the sludge with a solvent comprising a distillate stream from a refinery unit, which solvent comprises 40 to 75 percent by weight aromatics and has a boiling point of 100° to 600° C., wherein the sludge to solvent ratio in the extraction zone is about 2:1 to 1:5, whereby oil components of the sludge are extracted into the solvent;
   (b) in a separation zone, separating the mixture formed in the extraction zone into at least two streams: a first stream comprising solvent and extract, and a second stream comprising substantially all of the solid material in said sludge;
   (c) repeating steps (a) and (b) if further reduction in the oil content of the sludge is desired;
   (d) in a combustion zone, employing the solid material produced in step (b) as a source of fuel; and
   (e) blending the first stream from step (b) with crude oil for reprocessing in the refinery.

2. A process for deoiling an oily sludge produced in a refinery, consisting essentially of the following steps:
   (a) in an extraction zone, mixing the sludge with a solvent comprising a distillate stream from a refinery unit, which solvent comprises at least 20 percent by weight aromatics and has a boiling point of 100° to 600° C., wherein the sludge to solvent ratio in the extraction zone is about 2:1 to 1:5, whereby oil components of the sludge are extracted into the solvent;
   (b) in a separation zone, separating the mixture formed in the extraction zone into at least two streams: a first stream, comprising solvent and extract, and a second stream comprising substantially all of the solid material in said sludge;
   (c) repeating steps (a) and (b) if further reduction in the oil content of the sludge is desired;
   (d) recovering the first stream from step (b) and recycling at least a portion of said first stream to said refinery for processing in a FCC process unit; and
   (e) recovering the second stream from step (b) for use as a fuel or for landtreatment.

3. The process of claim 2 wherein the solvent comprises 40 to 75 weight percent aromatics.

4. A process for deoiling an oily sludge, consisting essentially of the following steps:
   (a) in an extraction zone, mixing the sludge with a solvent comprising a distillate stream from a refinery unit, which solvent comprises 40 to 75 percent by weight aromatics and has a boiling point of 100° to 600° C., wherein the sludge to solvent ratio in the extraction zone is about 2:1 to 1:5, whereby oil components of the sludge are extracted into the solvent;
   (b) in a separation zone, separating the mixture formed in the extraction zone into at least two streams: a first stream, comprising solvent and extract, and a second stream comprising substantially all of the solid material in said sludge; and
   (c) repeating steps (a) and (b) if further reduction in the oil content of the sludge is desired.

5. The process of claim 4 wherein at least a portion of the solid material produced in step (b) is used as a source of fuel.

6. The process of claim 4 wherein at least a portion of the first is blended with crude for reprocessing in a process unit.

7. The process of claim 4 wherein at least a portion of the second stream produced in step (b) is subjected to aerobic biodecomposition during landtreatment.

* * * * *